United States Patent [19]

Henne

[11] 4,455,338
[45] Jun. 19, 1984

[54] REINFORCED FOAM BODY FOR VEHICLE DASHBOARDS, OR THE LIKE

[75] Inventor: Helmut Henne, Wuppertal, Fed. Rep. of Germany

[73] Assignee: Gebr. Happich GmbH, Fed. Rep. of Germany

[21] Appl. No.: 440,289

[22] Filed: Nov. 9, 1982

Related U.S. Application Data

[63] Continuation-in-part of Ser. No. 231,036, Feb. 4, 1981, abandoned.

[30] Foreign Application Priority Data

Mar. 28, 1980 [DE] Fed. Rep. of Germany ....... 3012007

[51] Int. Cl.³ .................. B32B 3/10; B32B 5/18; B60K 37/00
[52] U.S. Cl. .................................. 428/137; 180/90; 296/70; 428/158; 428/174; 428/224; 428/286; 428/304.4; 428/308.4; 428/316.6; 428/318.8
[58] Field of Search ............... 428/137, 174, 224, 245, 428/255, 286, 256, 158–160, 304.4, 308.4, 316.6, 318.8; 296/70, 72, 31 P, 31 R; 156/79; 100/90

[56] References Cited

U.S. PATENT DOCUMENTS 3,549,469  12/1970  Wilfert .................................. 296/70

FOREIGN PATENT DOCUMENTS

| 811006444 | 8/1982 | European Pat. Off. . |
| 36925 | 5/1983 | European Pat. Off. . |
| 1219215 | 6/1966 | Fed. Rep. of Germany . |
| 2114181 | 10/1972 | Fed. Rep. of Germany . |
| 2408777 | 9/1975 | Fed. Rep. of Germany . |
| 2656965 | 7/1979 | Fed. Rep. of Germany . |
| 2854544 | 9/1979 | Fed. Rep. of Germany . |
| 2849197 | 8/1980 | Fed. Rep. of Germany . |

*Primary Examiner*—Paul J. Thibodeau
*Attorney, Agent, or Firm*—Ostrolenk, Faber, Gerb & Soffen

[57] ABSTRACT

The disclosure concerns a foam body which is supported by an embedded reinforcing insert. The foam body may serve as a vehicle dashboard, or the like. The reinforcing insert includes harder parts in the form of straps around the ends of the insert and extending across the insert defining open areas and also plates having openings through them. The insert includes more yieldable parts comprised of textile-like material which extends over some of the open areas defined by the hard parts of the insert, but leaving still other open areas of the hard part uncovered. A skin layer over the exterior of the foam body extends into openings in the foam body which are defined at some of the open areas of the insert. The foam body also has recesses, and some of these recesses are at open areas of the insert.

19 Claims, 12 Drawing Figures

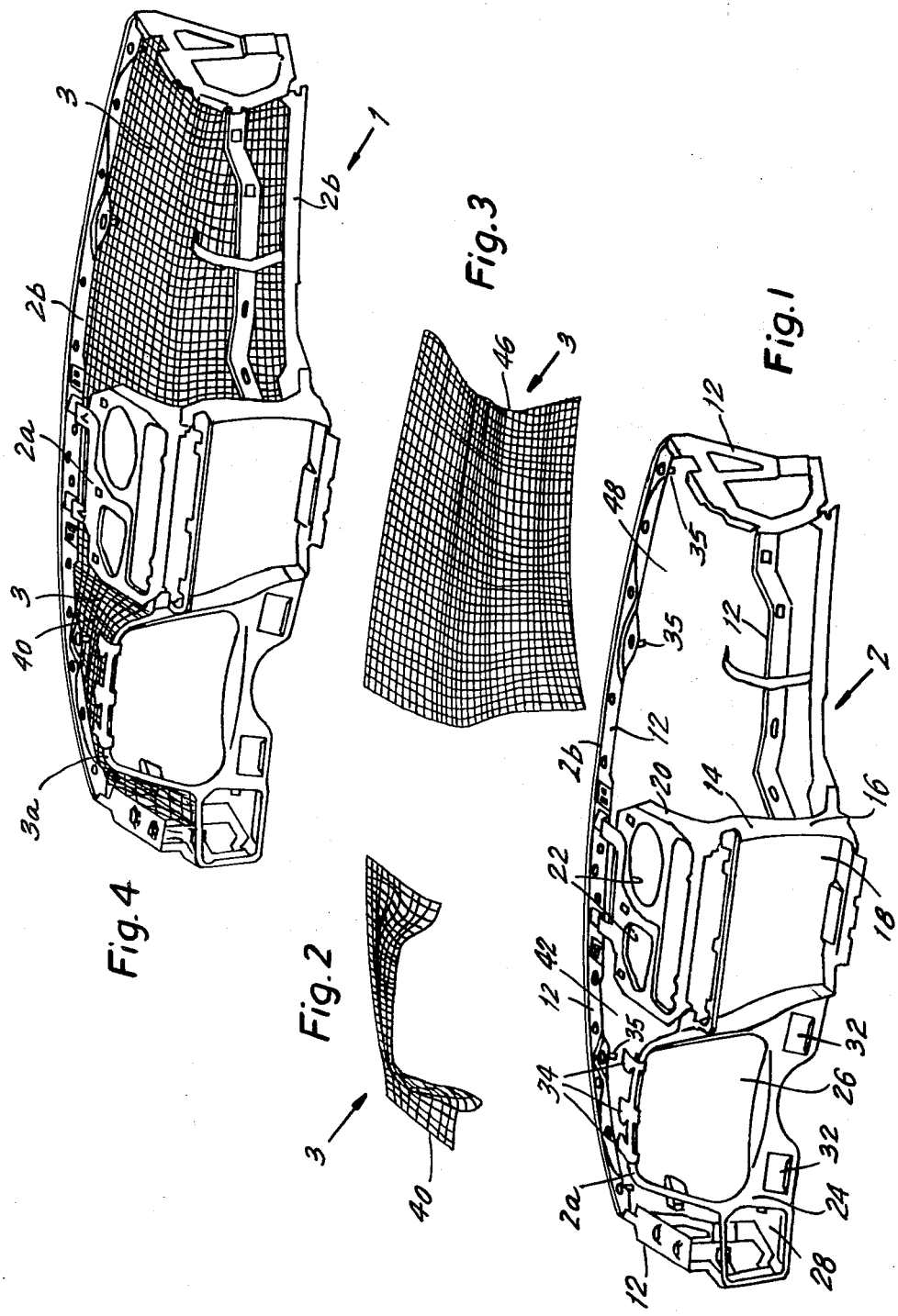

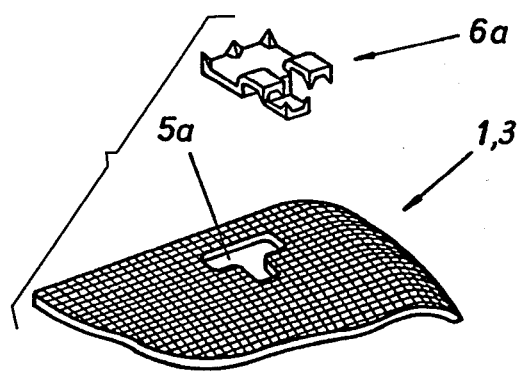
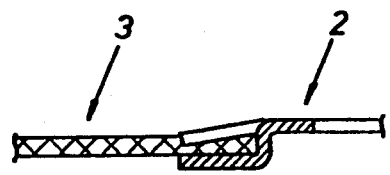
Fig. 8   Fig. 9
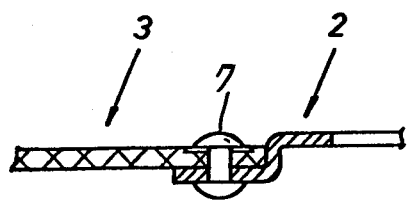
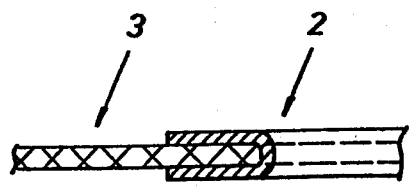
Fig. 10   Fig. 11
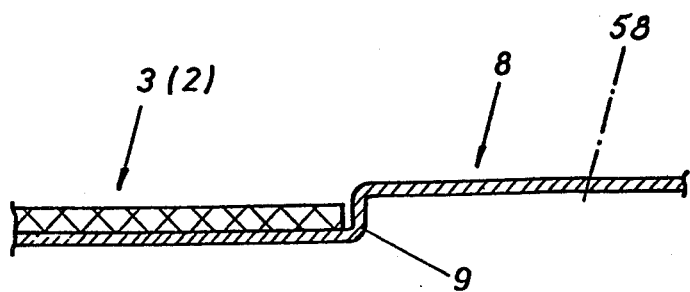
Fig. 12

REINFORCED FOAM BODY FOR VEHICLE DASHBOARDS, OR THE LIKE

CROSS REFERENCE TO RELATED APPLICATION

This is a continuation-in-part of application Ser. No. 231,036, filed Feb. 4, 1981, now abandoned.

BACKGROUND OF THE INVENTION

This invention relates to a rigidified, lightweight foam body for use as a dashboard for an automotive vehicle, or the like. The foam body is surrounded by a skin made of the same material, or of a thin foil material or by a skin formed from liquid media in the production mold for the foam body. The foam body has a rigid supporting insert. Molded parts project from a flat area of the body. Also, there are openings in the completed foam body permitting installation therein of various instruments and controls for the vehicle operator. Although this foam body is particularly useful as a dashboard for a motor vehicle, other uses may be apparent to persons skilled in the art.

A foam body can be reinforced by an insert which is comprised either of a soft, flexible or yieldable material, such as a glass fiber mat, or by a rigid material, such as metal or molded plastic. Typically, however, a foam body is not provided with both types of reinforcing inserts. Use of the different types of inserts yields foam bodies of greatly differing stability. The degree of stability, which is rather limited by the insert selected, cannot be optimally adapted to all of the various uses of these foam bodies.

German Allowed Application (Auslegeschrift) No. 28 54 544 describes a method for fabricating a fiber reinforced molded foam part. An attempt is made to attain adequate strength for the molded foam part with a minimum of material, so that even large-sized foam parts can be produced with sufficient strength and inherent stability. The difficulties of accomplishing this are great and the known solutions are complicated, as evidenced by the state of the art.

The serviceability of a molded foam part is greater when the reinforcement itself already has the required strength. Such a molded foam part is described in German Published Application (Offenlegungsschrift) No. 24 08 777, which concerns a dashboard for motor vehicles that includes a metal reinforcing insert. The metal insert extends over the full area of the dashboard. It can be given the necessary supporting capacity, which is the basis of the other previously indicated requirements, by selection of appropriate materials and by special designs.

The full-faced metal frames of the type disclosed in this German application have disadvantages, however, which particularly appear in the foam bodies used in the automobile industry. First, there is the weight of the frame. The metal framework adds about 2 kg. more weight in a medium sized car, compared to other reinforcements, such as a glass fiber framework. An adhesive joint between the foam (and also of a covering layer over the foam) and the metal framework is not readily possible. Therefore, bonding agents must be used or many openings must be provided in the metal plate to anchor the foam. Undercutting in the production mold is not possible because of the rigidity of the metal plate, which makes demolding difficult. To make an instrument panel, the insert also requires an easily moldable, deep-drawable and and therefore expensive insert material. The production mold for the one-piece metal part is large and thus expensive. In addition, long station times are required for the production of large pieces, as the initial inserts are frequently formed in several stages. One solution to this problem is to produce the insert from several parts. But, these small manufacturing advantages are offset by the fact that the various parts must first be joined with each other, primarily by welding.

SUMMARY OF THE INVENTION

The object of the invention is to provide a reinforced foam body, such as a dashboard for a motor vehicle, which is simple to produce, which includes a reinforcing insert and which can be adapted very accurately to particular requirements for instrument panels, or the like.

Another object is to provide a reinforced foam body which has both rigid and more yieldable areas.

A further object is to provide a reinforced foam body which is lighter in weight than prior reinforced foam bodies.

According to the invention, the insert for the foam body includes first regions comprised of hard, inherently stable insert parts, which alternate with second regions comprised of soft, more yieldable insert parts, at which the foam body may yield for safety reasons, for example. It is of particular advantage if the inherently stable insert parts are formed of metal or rigid molded plastic framework elements and if the yieldable insert parts are mats or fibrous webs with textile weave, such as woven fabrics, knitted or non-woven fabrics and glass fiber webs. There are also openings in the completed foam body at which instruments and controls are located.

A molded foam body, and particularly a large sized one, may have to perform differing functions at different regions across the foam body. For instance, a dashboard has fixed, non-yielding and very strong regions, where tear resistance and pull-out resistance are very important, as where instruments, controls and other equipment like a radio, are supported. These regions are few and are of small area. For these few, small regions, inherently stable insert parts are used. For example, sheet metal reinforcement may be used. These inherently stable insert parts need not be made exclusively of sheet metal. They can also be hard and inherently stable plastic bodies, e.g. injection-molded, blow-molded objects or objects produced by the lay-on method. The weight of this small amount of metal or other stable material, over such small areas, is not significant.

Where the hard, stable insert parts are of metal, use of only a few small metal parts results in material savings and a substantially lower weight for the resulting foam body. There are also manufacturing advantages. The smaller sheet metal parts are simpler to produce, because only smaller and relatively inexpensive molds are required, and partly because sheet metal sections can be used. A low quality sheet metal can be used, particularly because deep drawn areas of the foam body need not be reinforced with sheet metal or other hard material. The hard part of the insert may be comprised of straps defining the ends or edges of the insert, other straps between the ends of the insert and plates, often having openings through them for securing therein instruments and controls. These straps define large open areas of the insert.

The yieldable areas of the completed foam body, which alternate with the stable sheet metal parts, need not be reinforced in may cases, whereby some, although smaller, areas can be free of any hard material reinforcements. Larger areas or smaller more stressed areas, however, are reinforced with hard and stable insert material.

Some of the open areas between the hard and stable material insert parts are reinforced by using a more yieldable insert material, which still provides a reinforcing insert for the foam material of the foam body. Known yieldable reinforcing materials, particularly glass fiber structures, can be used. The weave (where there is one) and the resistance to deflection of the material determines which materials are applied at which locations. Knitted materials, for example, are used for molded parts that project greatly. Woven fabrics are used for areas projecting slightly and non-woven fabrics are used for flat areas. Other open areas of the insert require no reinforcement either because they are at openings through the foam body, for receiving instruments, or because the unreinforced foam body at that location is strong enough.

Despite the different structures in different regions of the reinforcing insert of the foam body, there is no additional work required at the point of assembly of the insert from its parts for working with, changing, cutting, etc. the reinforcing insert, even with an insert with several or even many, openings through it. Heretofore, openings had to be cut in the foam body, and through the insert also subsequent to the foam molding. This presents great difficulties, particularly when the reinforcing insert material is glass fiber. Glass fibers are hard to cut. Cutting tools are soon blunted, which results in torn-off separating edges and subsequent tearing of the fabric part of the insert, so that the insert may become unusable. The difficulty encountered with glass fiber inserts can be easily overcome using the structure according to the invention. Thus, it is advisable to assemble the insert from glass fiber fabric sections of different widths, dependent upon their use, having weaves likewise adapted to their use. With these different sections, it is possible to cover reinforcing insert insert folds generally, and particularly the projecting areas, by a simple lay-on method, without folds. To form an opening having a straight edge, a fabric insert part is simply left out.

An additional advantage of the invention is the possibility of forming a round opening or one with partly curved edges, by using an appropriately shaped strip of fabric material having a knitted weave and no folds.

Some of the regions of the yieldable fabric parts of the insert may be overlapping sections of fabric, and these may be arranged in the form of struts which thus also reinforce the insert.

The insert according to the invention is always built in or on a corresponding mold. This makes it possible to put the parts of the insert individually into their respective molds and to then foam them to form a foam body. It may be advisable, however, to initially join selected ones of the hard and inherently stable insert parts with the yieldable, fabric insert parts at least partly and/or at certain regions before they are inserted in the mold in which the insert is foamed. It is discretionary whether the insert parts are all or partly joined before or only after they have been placed in the foaming mold.

In addition to their form which serves to reinforce the molded foam parts, the various reinforcing insert parts have other physical features which serve as adjusting stops with the production mold and/or with special bearing surfaces or stops associated with the production molds. These features include openings, noses arranged at the edges, recesses, cams or tongues projecting from the general area of the insert.

The foam body may have no special outer skin. Its completed, closed surface may remain untreated. It is preferably upgraded by being provided with a liquid compound in the mold, which forms a skin or by being provided with a flocked coating or with another plastic material skin layer.

Preferably, however, the visible side of the foam body will be provided with a foil covering. This covering may be one which previously was given the final form of the foam body, or one which is formed in the mold. At least some of the openings of the foam body are at least partly covered with the foil forming the skin. At these openings the foil layer extends around the folds in the foam body and protrudes into these openings in the foam body to form a recess in the foam body. The recess forming folds in the foam body define stops for positioning of the reinforcing insert. Due to this design, parts of the foil skin, which are later removed, are used to form stops for the proper positioning of the parts of the insert.

For manufacture of the foam body and also for its use as a vehicle dashboard, it may be advantageous if the reinforcing insert terminates at least partly a distance (of about 2 mm or more) in from the circumferential edges of the foam body and/or from the edges of the openings in the foam body. Thus, from a manufacturing point of view, the edges of openings in the foam and corresponding openings in the reinforcing insert need not be congruent, simplifying manufacture. From the point of view of the use of the foam body in a dashboard, it is frequently useful to make the openings that receive instruments, controls, nozzles, etc. elastic, so that adaption is easier and a connection, such as a clip-connection, can be established more advantageously.

Furthermore, particularly to form a vehicle dashboard, and for other uses also, the foam body may be relatively thin in its thickness dimension, as compared with its length and width dimensions. Also, it may be bent other than flat, e.g. a dashboard is curved in shape, rather than being flat.

Other objects and features of the invention will be understood from the following description and accompanying drawings.

BRIEF DESCRIPTION OF THE DRAWINGS

FIG. 1 is a perspective view of the hard rigid parts a reinforcing insert framework used for producing a foam material dashboard for a motor vehicle;

FIGS. 2 and 3 show two fiber material sections to be installed on the rigid part of the insert of FIG. 1;

FIG. 4 shows the insert parts of FIGS. 1-3 assembled to define the completed reinforcing insert;

FIG. 8 shows a part of the insert with a fastening element;

FIGS. 9, 10 and 11 show various embodiments of joints of insert parts, viewed in section; and FIG. 12 shows a part of a preshaped foil and another insert part, viewed in section.

DESCRIPTION OF A PREFERRED EMBODIMENT

Figure 5:
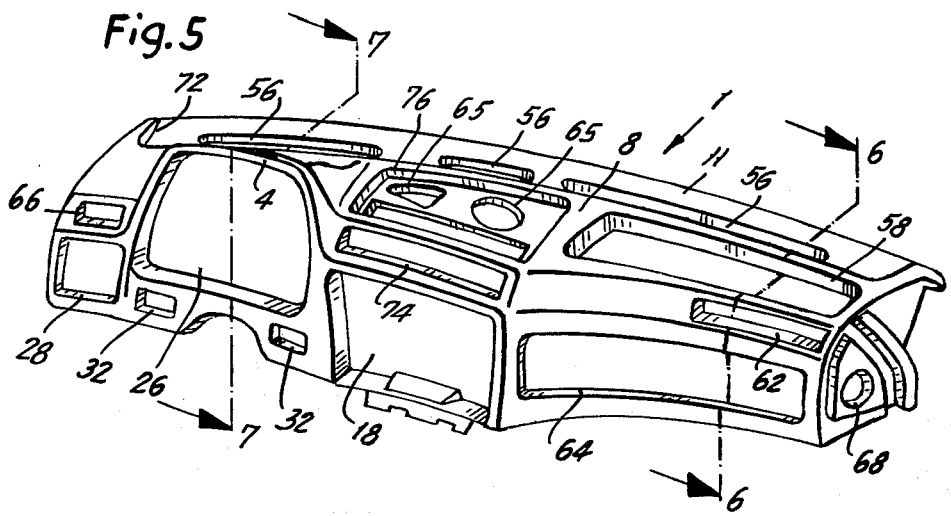
FIG. 5 is a perspective view of a dashboard for an automotive vehicle comprising a foam body incorporating the insert of FIG. 4.

Foam body 1 of FIG. 5 is designed to serve as a dashboard for a motor vehicle. The foam body is comprised of the hard, non-yieldable thin strip, metal rigidifying insert 2, shown in FIG. 1, the yieldable, fiber mat insert parts 3 shown in FIGS. 2 and 3, the conventional plastic foam material layer 11 in which the insert is embedded and which the insert strengthens and rigidifies, as required, and the covering skin or foil layer 8 which is bonded to the foam layer and/or the yieldable parts of the reinforcing insert beneath the outer skin.

Turning to FIG. 1, the metal insert 2 is comprised of a number of metal straps 12, which are bent in a shape for ultimately producing a rigidified foam body of the desired shape, and which are joined together, and also includes a number of metal plates which define openings or recesses for controls, instruments, or the like. The plate 14 includes the upstanding front portion 16 thereof which is open at 18 for defining an opening for a radio, or the like. The plate 14 includes the horizontal, top portion 20 with openings 22 in it which ultimately define recesses in the finished dashboard. Similarly, there is the plate 24 which is supported to the straps 12. It has the large opening 26 in it where the speedometer and perhaps other indicating instruments might be mounted, has the opening 28 in it for other instruments or for an air-conditioning duct, for example, and finally has the openings 32 through it, through which other instruments may be viewed. Additionally, the top edge of the plate 24 has holding pieces 34 defined in it for holding the yieldable insert part, to be described. The straps 12 around the rear and the left side of the insert 2, as seen in FIG. 1, include means for attaching the peripheral edge of the below-described mat 40 there, as can be seen in FIG. 4, securing the mat in position. Similarly, the left side of the plate 14 and the clamping means 34 also secure the mat. The precise shape and orientation of the straps and plates of hard material is selected dependent upon the particular need for rigidity and in order to provide the proper external profile to the completed dashboard. Other shapings and arrangements of straps and plates of the hard material for the reinforcing insert will be selected for differently shaped dashboards and differently shaped foam bodies.

The insert includes conventional fastening elements 35 which are insertable in known manner in receiving openings in the body of the vehicle where they are then secured.

With reference to FIGS. 2, 3 and 4, the reinforcing insert 1 includes yieldable parts 3 which comprises a mat of glass fibers 40. Various alternatives to a glass fiber mat have been mentioned in the general description above. The glass fiber mat 40 is yieldable. It is initially cut out to fit over the open area 42 defined between the straps 12, the upper portion 20 of the plate 14 and the top periphery and clamping pieces 34 of the plate 24. With the mat 40 of yieldable material mounted as shown in FIG. 4, the mat, which may not initially have the shape shown in FIG. 2, is deformed into that shape and gives the area of the insert 1 over the open area 42 the shape illustrated in FIGS. 2 and 3. This is a yieldable part of the insert. In the typical dashboard illustrated, the yieldable part 40 of the insert is behind the speedometer and thus in front of the driver, whereby if there is impact against the speedometer, the part 40 of the insert is likely to yield, minimizing damage from impact at that location. At the same time, the mat 40 will provide a support for the foam material of the dashboard when it is applied.

Turning to FIGS. 3 and 4, the other yieldable part 3 of the reinforcing insert comprises a second mat of glass fibers 46, or the like above-described material. The mat 46 is deformed in shape, as illustrated in FIGS. 3 and 4, for covering the open areas 48, 52, and the mat is secured at its edges to the straps at the bottom front of the hard insert part 2 and at the top rear of the insert part 2, at the plate 14 adjacent to it at the left in FIG. 1 and at the end of the metal insert part at the right. To help position the mat, it also is secured beneath the straps passing over the middle front of the insert and dividing the open spaces 48, 52. As with the mat 40, the straps engaging the mat 46 include means for securing the edges of the mat in position. The hard part 2 of the insert supports the mat in the shape shown in FIG. 4, and determines the ultimate shape of the dashboard of foam material.

It is significant that the mats 40 and 46 are shaped so that they do not extend over the openings 18, 22, 26, 28 and 32. The fiber mats can be easily shaped by cutting after their initial formation or during their initial formation to the desired size and shape for covering the openings and for surrounding any openings it is desired that they cover and surround. Although the fiber mats 40 and 46 are shown connected with the metal insert 2 all around their peripheries, they may be supported by the metal frame around less than their entire peripheries, and may be only in abutting relationship at some of their sides or may even be spaced apart from each other at least some of their sides by a small gap. Where a mat extends to the edge of an open area, as with opening 26, the hard material surrounding the open area would at least partially overlap the mat, providing a clear delineation between the mat and the open area. Furthermore, the yieldable material may extend over and cover over the outside of some or all of the hard interior portions of the insert.

The mat 40 may be a single mat of fibrous material, as illustrated. However, it is also possible for the mat 40 to be comprised of a number of separate layers of material, one extending over the top of the opening 26 and others extending down the sides of that opening 26. Although a single mat layer is shown, the mat layer may also be doubled, with the mat along the lateral sides of the opening including a double layer of material, rather than a single layer.

Figure 6:
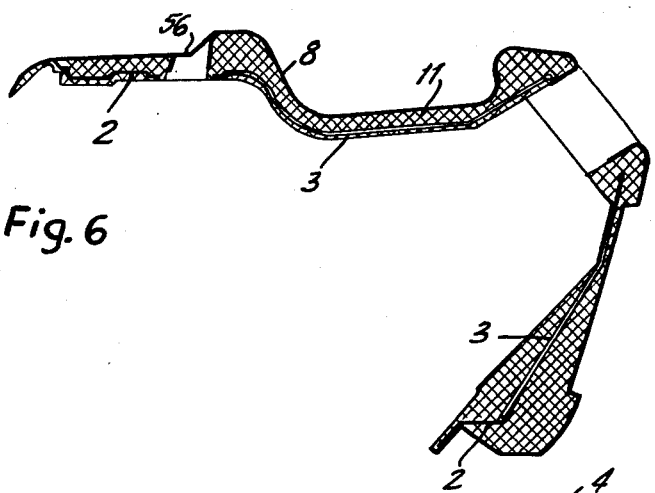
FIG. 6 is a cross-sectional view of the dashboard at the line 6—6 in FIG. 5.
Figure 7:
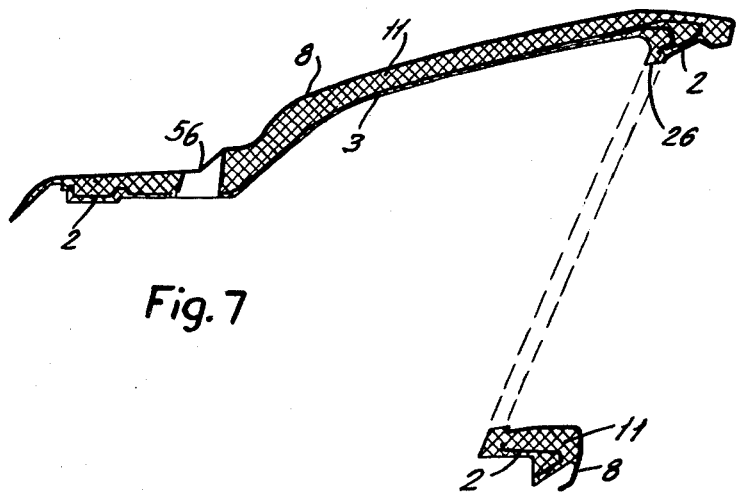
FIG. 7 is a cross-sectional view of the dashboard at the line 7—7 in FIG. 5.

Referring to FIGS. 5-7, the entire reinforcing insert of FIG. 4 is now installed in an injection mold (not shown). Already in that injection mold is a preformed foil layer of a plastic material adapted to bond to a layer of foam. The mold itself is shaped so that when the installed insert is eventually foamed, the resulting dashboard will have the desired profile. The cavity of the mold is obviously thicker than the insert, so that the insert will be covered over with the foam material. Referring to FIG. 5, the mold (not shown) is configured so that upon injection therein of the foam material 11, the foam material has the illustrated profile. For the dashboard, the foam body is relatively thin in its thickness dimension, as compared with its length and width. The mold is shaped so that the openings 56 are defined to extend through the entire foam body. Also, the recess 58 is defined on the top of the foam body without extending through it, as a result of the cooperating shape of the mold and the cooperating deformed shape of the insert 3 at that location. The opening 62 is defined through the entire foam body and the front recess 64 is also defined. Similarly, with reference to FIG. 7, the mold is shaped for defining the opening 56 and the much larger opening 26 at the front of the foam body. The other through openings 28, 32 and 18 are defined in the same manner by appropriate shaping of the mold in cooperation with the openings in the reinforcing insert. The recesses 64 are also formed in the mold body in cooperation with the openings 22 in the rigid part of the insert. Other openings, like 66, 68 are defined in the mold by appropriate shaping thereof. The insert, however, includes no part thereof which specifically defines the outline for these openings and it is merely the mold for the foam body which shapes and defines these openings. The same would apply to other recesses and surface profiling, as at 72, 74, 76 on the dashboard.

Various openings 56 and 62 extend entirely through the foam body of the dashboard and pass through the fiber mats 40 and 46. In FIGS. 2, 3 and 4, no provision for these openings has been made. Accordingly, before the insert is installed in a mold where the foam material is applied to the insert, the yieldable material of the insert is cut out at the areas where these openings are to be defined. This enables the mold (not shown), which is shaped for defining these openings by excluding deposit of foam material there, to shape the openings in the foam material of the foam body.

Other recesses, openings, projections, ribs, etc. can be defined in the foam body by appropriate shaping of the mold.

Although a separate foil skin layer 8 is shown which is attached to the foam material during the injection process, various skins or coverings may be provided for the dashboard in the mold or outside the mold. In fact, the dashboard may have no added skin, but the mold itself may sufficiently smooth the foam material on the exterior of the foam body sufficiently to define an integral exterior shell for the foam body.

The installed foil skin layer 8 has been pre-cut so that it extends into and at least partially down the sidewalls of the openings 56, 62, 26, etc., at 70. The foamed material is inserted into the mold in heated condition and the foil-like skin layer is of a material which is bonded to the foam layer during injection, thereby integrating the skin with the reinforced foam body within.

FIG. 8 shows a yieldable part 3 of a rigidifying insert 1 for a foam body with an opening 5a for a fastening element 6a. This opening can be formed according to the invention by simply leaving out a portion of the yieldable material of the insert when the mat thereof is formed or the insert can be cut out subsequently to form the opening.

FIGS. 9, 10 and 11 show embodiments of rigid connections between a hard insert part 2 and a yieldable insert part 3. In the embodiment of FIG. 9, there is an insert part 2 of sheet metal, wherein a tongue, cut free on three sides, is bent off from an edge zone of the insert part 2. Then an insert part 3 is clamped between the main and bent off sections of the insert part 2. The embodiments of FIGS. 10 and 11 show that materials other than metal and shapes which are not comprised of simple plane surfaces can be used for hard insert parts 2. For example, as noted above, hard insert parts 2 may be formed from injection moled plastic. FIG. 10 shows the connection of insert parts 2 and 3 by yet another part, here a rivet 7. In FIG. 11, insert part 3 is simply inserted into a U-shaped trough of insert part 2, and a secure press fit is made.

FIG. 12 shows a pre-shaped foil skin 8, which is recessed to the inside at 9 over a recess 58, not fully shown here. Fold 9 forms a stop for an insert part 2 or 3 so that the exact positioning of such an insert part is possible without cooperation of any further elements.

Although the present invention has been described in connection with a preferred embodiment, many variations and modifications will now become apparent to those skilled in the art. It is preferred, therefore, that the present invention be limited not by the specific disclosure herein, but only by the appended claims.

What is claimed is:

1. A reinforced, molded, foam body, including recesses and openings therein, comprising:
   a reinforcing insert, comprising:
   a hard, relatively unyielding part, extending over a first region of the foam body and shaped and placed for generally shaping the profile of the foam body; the hard part being shaped to define first open areas and second open areas through the hard part;
   at least one soft and relatively yieldable part positioned to extend across and at least partially cover a respective second open area of the hard part, and the yieldable part will generally yield upon impact thereupon; the soft part being attached to and supported on the hard part adjacent the respective second open area;
   at least one first open area remaining uncovered;
   a layer of foam material; the reinforcing insert being embedded in the foam material layer and reinforcing the foam material layer, and the foam material layer having an external profile generally defined by the external profile of the insert; and the foam body having an opening therethrough at least one first open area of the insert.

2. The foam body of claim 1, wherein the hard part of the insert includes end portions and includes other portions extending at least partially across the hard part between its end portions, whereby the other portions separate and define the adjacent open areas; and the other portions each defining at least one side of one of the open areas.

3. The molded body of claim 2, wherein there are a plurality of the second open areas and a respective yieldable part for each of the second open areas.

4. The foam body of claim 2, wherein the foam body has a circumferential edge and the insert extends toward the circumferential edge but terminates at least partly inwardly a distance from the circumferential edge of the foam body.

5. The foam body of claim 1, wherein the hard part of the insert is comprised of metal.

6. The foam body of claim 1, wherein the hard part of the insert is comprised of molded plastic.

7. The foam body of claim 1, wherein the yieldable part of the insert comprises a fibrous mat.

8. The foam body of claim 7, wherein the yieldable part of the insert comprises a mat of yieldable material.

9. The foam body of claim 1, wherein the foam body has a circumferential edge and the insert extends toward the circumferential edge but terminates at least partly inwardly a distance from the circumferential edge of the foam body.

10. The foam body of claim 2, wherein the foam body includes recesses defined in it.

11. The foam body of claim 10, wherein the recesses in the foam body are located over at least some of the second open areas of the hard part and the recesses also extend through the foam material layer.

12. The foam body of claim 10, wherein the recesses in the foam body are located over at least some of the first open areas of the hard part and the recesses also extend through the foam material layer.

13. The foam body of claim 12, wherein the recesses in the foam body are also located over at least some of the second open areas of the hard part and the recesses also extend through the foam material layer.

14. The foam body of claim 1, further comprising a skin layer over the foam body and the skin layer having openings therethrough, defined at the openings through the foam body.

15. The foam body of claim 14, wherein the skin layer is shaped to extend at least partly into the openings in the foam body.

16. The foam body of claim 15, wherein the foam material layer has folds therein defined at the first open areas of the insert; and the skin layer protrudes into the openings in the foam body at the first open areas of the insert and over those folds of the foam material layer.

17. The foam body of claim 16, wherein the folds in the foam material layer also serve as respective stops for limiting the position of adjacent parts of the insert.

18. The foam body of claim 2, wherein the hard part of the insert is shaped to be other than flat.

19. The foam body of claim 18, wherein the foam body is generally flat in its thickness cross-section as compared with its length and width dimensions.

* * * * *